(No Model.)

M. W. DEWEY.
ELECTRIC MOTION TRANSMITTER.

No. 439,577. Patented Oct. 28, 1890.

WITNESSES:
J. J. Laass
C. L. Bendixon

INVENTOR,
Mark W. Dewey,
BY
Shull, Laass & Shull
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

ELECTRIC MOTION-TRANSMITTER.

SPECIFICATION forming part of Letters Patent No. 439,577, dated October 28, 1890.

Application filed June 23, 1890. Serial No. 356,394. (No model.)

*To all whom it may concern:*

Be it known that I, MARK W. DEWEY, of Syracuse, in the county of Onondaga, in the State of New York, have invented new and useful Improvements in Electric Apparatus for Transmitting Motion from a Motor to a Shaft, (Case No. 63,) of which the following, taken in connection with the accompanying drawings, is a full, clear, and exact description.

My invention relates to means for transmitting motion from a motor to a shaft or wheel to be driven thereby, and for maintaining the motion of said shaft or wheel at a lower rate of speed than that of the motor.

The object of my invention is to provide a simple, regulable, flexible, and frictionless connection between a motor, preferably an electric motor, and a shaft or wheel to be driven thereby, to dispense with the rigid connections, as cog-wheels, chains, &c., usually employed.

It is well known that the common gearing—such as gear-wheels—which was required in order to reduce the speed from the motor is objectionable for the reason that it quickly wears out, is noisy, cumbersome, and requires to be cushioned in some way to prevent its breaking when the motor is started or stopped suddenly. My invention is devoid of all such objections. The motor may be rigidly mounted upon the truck, the gear-wheels may be entirely or partly dispensed with, the motor can be run at a high speed, and the shaft, wheel, or axle, or the part to be driven, operated at any desired lower rate of speed with the greatest ease and safety, and although the motor is not cushioned there will be no jerking motion if started or stopped suddenly.

Another great advantage derived from my invention is that the motor can be run continuously, if desired, without couplings or mechanical clutches of any kind and the movement of a car can be governed without changing the strength of the current flowing through the motor.

My invention consists in the combination, in a mechanism for transmitting a reduced speed to a shaft or wheel to be driven, of a series of magnets connected with an electric circuit and arranged to be moved, a conductor arranged to move in proximity to the poles of said magnets, and a motor to move either the magnets or the conductor, while one of said parts is mechanically connected to the said shaft or wheel.

My invention consists, also, in certain other combinations of apparatus hereinafter described, and more specifically set forth in the claims.

Figure 1:
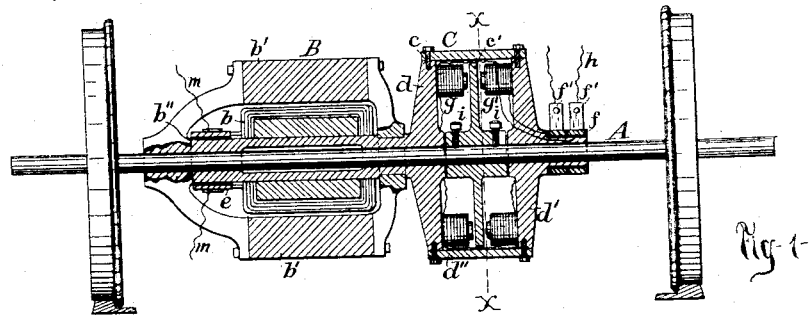
Figure 2:
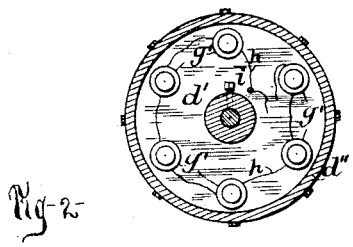
Figure 3:
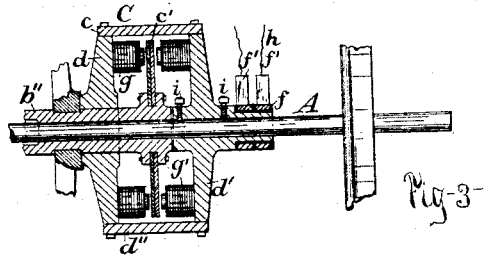
Figures 4, 5:
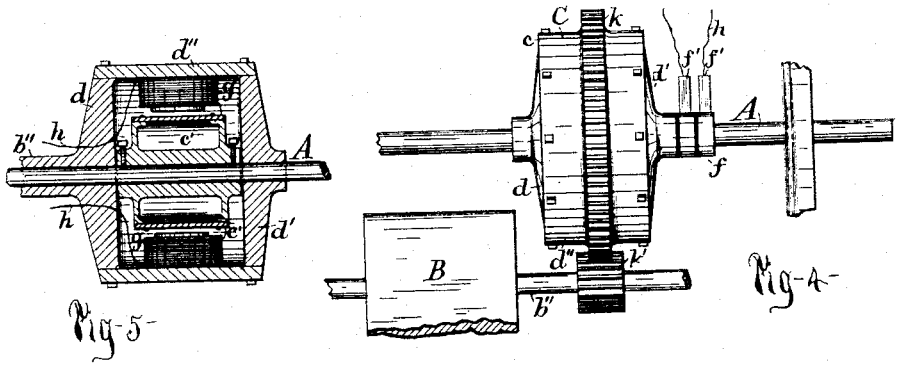
Figure 6:
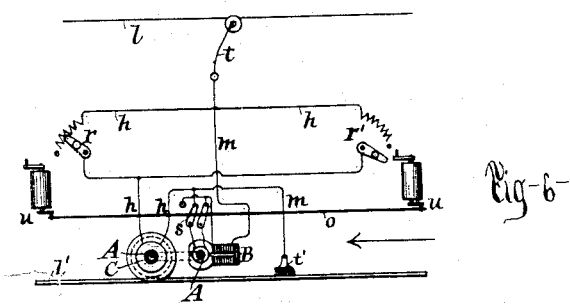

In the drawings forming a part of this specification, Figure 1 is an elevation of a car-axle and wheels having an electric motor and an electric motion-transmitting and speed-reducing mechanism in section mounted thereon. Fig. 2 is a view, partly in section, of the mechanism taken on line $x\ x$ of Fig. 1. Fig. 3 is a modification of Fig. 1. Fig. 4 shows a plan for connecting the mechanism directly with the motor when its armature is not sleeved upon the axle. Fig. 5 represents a modified form of the speed-reducing mechanism, wherein the conductor or plate is formed into a cylinder and the poles of the magnets are in proximity to its periphery; and Fig. 6 is a diagram of circuits and apparatus upon a car provided with my invention.

Referring specifically to the drawings, A represents a shaft with wheels thereon, or the axle and wheels of a car. B is an electric motor for driving the said shaft or axle, and C is the mechanism for transmitting a reduced motion from the motor to the axle.

Fig. 1 illustrates my preferred arrangement of the apparatus for transmitting motion to the axle A from the motor B, and consists in mounting the armature of the motor loosely upon the said axle and axially concentric with the same, thus dispensing with all gear-wheels or equivalents. To effect this, the armature $b$ or moving part of the motor is sleeved upon the axle while the field-magnet $b'$ is held stationary by suitably securing it to the truck-frame. Upon one end of the armature-shaft $b''$, opposite the end carrying the commutator $e$, is fixed or secured a part of the electric speed transmitting and reducing mechanism C, which is also sleeved loosely upon the axle A. In this case the part $c$ of the said mechanism fixed to the armature-shaft, is preferably formed integral with the same, and consists of a frame resembling two disks $d\ d'$ a distance apart, arranged facing each other and coupled together at their peripheries by a ring or cylinder $d''$, encircling them, and bolted or otherwise secured thereto. Upon the inner faces of each of the disks $d$ and $d'$ and near their peripheries are fixed a series of electro-magnets $g$ and $g'$, (shown also in Fig. 2,) with the poles of one series opposite to and facing the poles of the other series, but a distance apart. The coils of the magnets are wound so that north poles will face south poles; but the magnets of each series may either all present poles of the same polarity or different polarities, as desired, and said coils are preferably connected in circuit in series. In order to conduct the current to the said magnets I provide a two-ring commutator $f$, which is mounted upon but insulated from an extension of the hub of the outer disks $d'$, and shown in Fig. 1 in section and in Fig. 4 in elevation. Fixed brushes $f' f'$, connected with the terminals of the electric circuit $h$, bear yieldingly upon the rings, which are connected to the terminals of the conductor containing the coils of the magnets. Between the poles of the magnets $g$ and $g'$ is arranged a circular plate or disk $c'$ of conducting material—as iron or copper, preferably the latter—and is fixed to or forms a part of a hub which is securely keyed or fastened to the axle A by set-screws $i\ i$. This plate or disk and its connection constitutes the second part of the power transmitting and reducing mechanism.

It is well known that if a metallic or copper disk is rotated under and near a magnetic needle that the needle will rotate with the disk or in the same direction, but at a slower speed than the disk, and vice versa. This is due to the induction of currents in the copper by the movement of the needle, these currents being such as to oppose that motion of the needle which is the origin of the induction. My speed transmitting and reducing mechanism acts on the same principle, but is of course more powerful, as many powerful magnets are employed to act on both sides of a disk or a plurality of disks, as shown in Fig. 3. The operation of the mechanism in this case is as follows: The armature of the motor B rotates the part of the mechanism carrying the electro-magnets at the same speed as the armature, and the disk, forming the conductor of the induced currents, is both attracted and repelled vigorously in the same direction as the movement of the magnets but at a reduced speed, depending upon the speed of the magnets and the strength of their magnetism.

It will be obvious that either the magnets $g\ g'$ or the conducting-disk can be fixed to and rotated with the armature with equal effect, and to illustrate such transposition of parts, Fig. 3 shows a plurality of metal disks $c'$, securely fastened to the armature sleeve or shaft $b''$, and the part $c$, carrying the magnets $g\ g'$ loosely mounted upon the armature-shaft but rigidly fixed to the axle, as by set-screws $i\ i$. As motor-armatures are insulated in the same way, this insulation is not shown in the drawings.

It will be noticed that one of the parts of the transmitting mechanism is directly connected to the motor or the moving part of the same as the armature. This is done, if the armature is not sleeved upon the axle or supported by the same, by providing the periphery of the cylinder $d''$ with cogs $k'$, as shown in Fig. 4, to work directly in mesh with a pinion $k'$ on the armature-shaft $b''$. The term "directly" I desire to be understood as including any arrangement by which motion may be imparted from the motor to a part, as $c$, without the employment of an intermediate gear and counter-shaft.

I do not limit myself to a conductor or plate $c'$ in the shape of a disk or a plurality of disks, as said plate can be made in various other forms, as in the form of a cylinder, as shown in Fig. 5, in section. In this case the magnets are shown in one series and secured to the ring or cylinder $d''$, and with their poles extending quite close to the cylindrical place $c'$.

Referring now to Fig. 6 of the drawings to explain my preferred arrangement of electric circuits, $l$ represents an overhead line-working conductor of an electric railway; $l'$, the track or return conductor; $t$, the trolley carried by the car, and $m$ the main vehicle-conductor leading to and from the motor B, and connected to the trolley $t$ and track-contact $t'$. A indicates the axle and wheel of the vehicle, and C the speed transmitting and reducing mechanism. The motor B is shown separated from the axle A for the sake of showing the electric connections clearly, but may be understood to be mounted upon the axle, as shown in Fig. 1. $h$ is a shunt-circuit around the motor B, and includes the magnets $g\ g'$ of the mechanism C. $r$ and $r'$ are adjustable resistances in the shunt-circuit $h$, and at each end of the car to regulate the current flowing through said magnets to control their magnetism. The position of the resistances are for a car supposed to be moving in the direction of the arrow. The switch-arm of the resistance $r'$ is open or in its inoperative position, while the switch-arm of the other resistance is closed through more or less resistance, depending upon the speed of the car. When the car is moving in the opposite direction, $r$ is open and $r'$ closed; but when it is desired to stop the car both resistances are opened, thus preventing entirely the passage of current through the mechanism C. The movement of the car may be reversed in any suitable manner; but I have shown in the last figure a rod $o$ connecting a current-reverser $s$, located near the motor, with crank-arms $u\ u$ at each end of the car. The current can be interrupted through the motor, if desired, by a partial movement of the reverser $s$, which places the free ends of its levers between and not upon its contacts.

Other arrangements of circuits and connections may be employed, and I therefore do not limit myself to the arrangement herein shown and described.

Having described my invention, what I claim, and desire to secure by Letters Patent, is—

1. The combination of a shaft to be driven, an electric motor having its armature mounted loosely upon said shaft and axially concentric with the same, electric speed-reducing mechanism for transmitting motion from the armature to the shaft and connected to the said armature and shaft, consisting of one or more magnets in circuit with a source of electricity and a conductor in proximity to said magnets.

2. The combination, with an electric motor and a shaft or wheel to be driven, of a speed-reducing mechanism directly connected to the armature or the rotating part of the motor and to the said shaft or wheel to be driven, and consisting of one or more magnets in circuit with a source of electricity and a conductor in proximity to said magnets.

3. The combination, with an electric motor and a shaft or wheel to be driven, of an electric speed-reducing mechanism directly connected to the moving part of the motor and to the said shaft or wheel to be driven, and consisting of two parts in close proximity to and adapted to electrically attract each other.

4. The combination, with an electric motor and a shaft or wheel to be driven, of an electric speed-reducing mechanism for transmitting motion from the motor to the shaft or wheel, consisting, essentially, of two parts—one or more magnets and a conductor arranged to move in proximity to the poles of said magnet or magnets—one part being connected to the motor and the other connected to the shaft or wheel.

5. The combination, in a mechanism for transmitting a reduced speed to a shaft or wheel to be driven, of a series of magnets connected with an electric circuit and arranged to be moved, a conductor arranged to move in proximity to the poles of said magnets and mechanically connected to the said shaft or wheel, and a motor to move the magnets.

6. The combination, in a mechanism for transmitting a reduced speed to a shaft or wheel to be driven, of two parts, one consisting of one or more movable plates or disks of conducting material and the other of a series of magnets arranged to be moved with their poles in proximity to both sides of the one or more plates or disks, and means connected to one of the said parts to rotate the same, as and for the purpose described.

7. The combination, in a mechanism for transmitting a reduced speed to a shaft or wheel to be driven, of two parts, one consisting of one or more movable plates or disks of conducting material and the other of a series of magnets arranged to be moved with their poles in proximity to both sides of the one or more plates or disks, a circuit including said magnets, means to control the energy of the same, and a motor connected to one of the said parts to rotate the same.

8. The combination of a car-axle to be driven, an electric motor having its armature mounted loosely upon said car-axle and axially concentric with the same, and electric speed-reducing mechanism for transmitting motion from the armature to the car-axle, consisting of one or more magnets in circuit with a source of electricity, and a conductor in proximity to said magnets.

9. The combination, with an electric motor and a car-axle or wheel to be driven, of a speed-reducing mechanism directly connected to the armature or the rotating part of the motor and to the said car-axle or wheel to be driven, and consisting of two electric conductors in inductional relation to each other, and a source of electricity connected to one of the electric conductors.

10. The combination, with an electric motor and a car-axle or wheel to be driven, of an electric speed-reducing mechanism for transmitting motion from the motor to the car-axle or wheel, consisting, essentially, of two parts—one or more magnets and a conductor arranged to move in proximity to the poles of said magnet or magnets—one part being connected to the motor and the other connected to the car-axle or wheel.

In testimony whereof I have hereunto signed my name this 18th day of June, 1890.

MARK W. DEWEY. [L. S.]

Witnesses:
 C. H. DUELL,
 J. J. LAASS.